(12) United States Patent
Yagi et al.

(10) Patent No.: US 7,506,741 B2
(45) Date of Patent: Mar. 24, 2009

(54) WHEEL CONVEYOR

(75) Inventors: Shigeru Yagi, Hiratsuka (JP); Kazutake Gomi, Tokyo (JP)

(73) Assignee: Misuzu Koki Company Limited, Mie-ken (JP)

( * ) Notice: Subject to any disclaimer, the term of this patent is extended or adjusted under 35 U.S.C. 154(b) by 219 days.

(21) Appl. No.: 11/637,693

(22) Filed: Dec. 13, 2006

(65) Prior Publication Data

US 2007/0144863 A1    Jun. 28, 2007

(30) Foreign Application Priority Data

Dec. 26, 2005    (JP)    ............................ 2005-372017

(51) Int. Cl.
*B65G 13/00*    (2006.01)
(52) U.S. Cl. ...................... 193/35 R; 193/37
(58) Field of Classification Search ............... 193/35 R, 193/37
See application file for complete search history.

(56) References Cited

U.S. PATENT DOCUMENTS

| | | | | |
|---|---|---|---|---|
| 3,581,875 A | * | 6/1971 | Guis | 198/782 |
| 3,618,731 A | * | 11/1971 | Jindrich et al. | 193/35 J |
| 3,645,379 A | * | 2/1972 | Kornylak | 198/370.09 |
| 3,726,376 A | * | 4/1973 | Gotham et al. | 193/35 R |
| 3,869,031 A | * | 3/1975 | Coleman et al. | 193/35 R |
| 3,927,919 A | * | 12/1975 | Bunzli | 384/51 |
| 4,053,039 A | * | 10/1977 | Shuttleworth | 193/35 R |
| 4,067,428 A | * | 1/1978 | Shuttleworth | 193/35 R |
| 4,213,523 A | * | 7/1980 | Frost et al. | 193/37 |
| 4,645,056 A | * | 2/1987 | Palazzolo et al. | 193/35 A |
| 4,681,203 A | * | 7/1987 | Kornylak | 193/35 R |
| 6,105,746 A | * | 8/2000 | Faisant | 193/35 R |
| 6,490,983 B1 | * | 12/2002 | Nicholson et al. | 108/106 |
| 6,516,933 B1 | * | 2/2003 | Ledingham | 193/35 F |
| 6,769,528 B2 | * | 8/2004 | Plesh, Sr. | 193/35 R |
| 7,204,358 B2 | * | 4/2007 | Mueller | 193/35 R |

FOREIGN PATENT DOCUMENTS

JP    09-012122 A    1/1997

* cited by examiner

*Primary Examiner*—Douglas A Hess
(74) *Attorney, Agent, or Firm*—Rader, Fishman & Grauer, PLLC

(57) ABSTRACT

The present invention is a wheel conveyor comprising side frames, plate-shaped stays provided with wheel unit attachment grooves at an upper surface, and wheel units having fixed projections capable of being inserted into the wheel unit attachment grooves provided on an upper surface of the plate-shaped stays, the wheel units comprising two wheel attachment bodies, and a wheel rotatably provided between the two wheel attachment bodies, wherein, on plate-shaped stays provided spanning in a longitudinal direction across the side frames, one or a plurality of wheel units are detachably attached in a line arrangement in a longitudinal direction of the side frames, and one or a plurality are detachably attached in a line or interleaved arrangement in a widthwise direction.

5 Claims, 10 Drawing Sheets

WHEEL CONVEYOR

BACKGROUND OF THE INVENTION

1. Field of the Invention

This invention relates to a wheel conveyor for continuously conveying articles to be conveyed. In detail, the invention relates to a wheel conveyor formed by arranging a plurality of small wheels capable of conveying small objects to be conveyed into a plurality of lines to assemble a conveyor.

2. Description of the Background Art

A wheel conveyor formed by assembling a plurality of small wheels into a plurality of lines is disclosed in Japanese Patent No. 3002403 (related art 1). Related art 1 has a structure described as "a conveyor provided with a wheel unit comprising a double sided conveyor frame provided with groove sections running in a longitudinal direction, a plurality of transverse members connected between the double sided conveyor frame and capable of slidable engagement with end sections of these groove sections of the double sided conveyor frame, wheels provided in a plurality of lines between the double sided conveyor frame, having a roller section and a shaft section projecting from both ends of this roller section, and a wheel frame, formed in an elongated shape, formed with a plurality of wheel holding indents in which each of these wheels is rotatably fitted, formed with bearing grooves for rotatably supporting shaft sections of the wheels in edge sections of each of the wheel holding indents, and a plurality of engagement sections for engaging with the transverse members".

Generally, in the case of conveying small articles to be conveyed using a conveyor, there is a problem with a roller conveyor in that it is easy for the articles to be conveyed to drop down between the rollers.

The wheel unit of related art 1 has a fixed wheel holding section structure, and has a problem in that a fixed space must be attained for conveyance and safekeeping.

Also, the wheel unit of related art 1 has a problem that since wheel shaft sections are only engaged with bearing grooves from above, it is easy for them to come away upwards.

Further, the "plurality of transverse members connected between the double sided conveyor frame and capable of slidable engagement with end sections of these groove sections of the double sided conveyor frame" have "engagement sections of the wheel frame" attached above, but are fixed in position by an operation such as bolt fastening "rod shaped transverse members" positioned at bolt holes provided in the double sided conveyor frame in order to fix at positions coinciding with intervals between these engagement sections, one at a time from a frame outer side, and so there is a problem with respect to the time taken in an assembly operation.

Similarly, in the case of dismantling the wheel conveyor of related art 1 also, dismantling is not possible unless an operation to remove the bolts of the plurality of "rod-shaped transverse members" is carried out, and so there is a problem that operation becomes troublesome.

In the event that it is desired to install the wheel conveyor in an inclined manner, it is necessary to increase height by having some sort of member at end sections of side section frames.

SUMMARY OF THE INVENTION

A conventional wheel conveyor has a structure where rotating wheels are attached to a side frame via a fixed shaft and there are fixed wheel storing sections, and there is a problem that it is necessary to provide a fixed space for conveyance and storage.

The present invention is a wheel conveyor that solves the above described problems, having a structure comprising side frames, plate-shaped stays provided with wheel unit attachment grooves at an upper surface, and wheel units having fixed projections capable of being inserted into the wheel unit attachment grooves provided on an upper surface of the plate-shaped stays, the wheel units comprising two wheel attachment bodies, and a wheel rotatably provided between the two wheel attachment bodies, wherein, on plate-shaped stays provided spanning in a longitudinal direction across the side frames, one or a plurality of wheel units are detachably attached in a line arrangement in a longitudinal direction of the side frames, and one or a plurality are detachably attached in a line or interleaved arrangement in a widthwise direction.

According to this invention, since wheel units are assembled one at a time, the effect is achieved of being able to store and convey in a compact manner by disassembling for each component. Alternatively, since wheels are rotatably supported by a rotational shaft in a rotational bearing hole of a wheel attachment body, there is a reduced possibility of the wheels falling off during transit.

BRIEF DESCRIPTION OF THE DRAWINGS

FIG. 1 is a partial plan view of one wheel unit assembly.
FIG. 2 is a view from arrows AA in FIG. 1.
FIG. 3 is a disassembled plan view of one wheel unit.
FIG. 4 is a view along arrows BB in FIG. 3, showing an inner side surface of a wheel attachment plate.
FIG. 5 is a partial plan view of a wheel conveyor that is an embodiment of the invention, with part of a wheel unit removed.
FIG. 6 is a front view of the wheel conveyor with part of a wheel unit removed.
FIG. 7 is an expanded front explanatory view of the wheel conveyor.
FIG. 8 is a plan view of one plate-shaped stay that is an embodiment of the invention.
FIG. 9 is a side end view of one plate-shaped stay.
FIG. 10 is a side view of a slide engagement section attached to the plate shaped stay.
FIG. 11 is a plan view of a slide engagement section attached to the plate shaped stay.
FIG. 12 is a side cross section of a side frame in an embodiment of the invention.
FIG. 13 is a plan view of an end of a wheel conveyor of the embodiment of the invention provided with a reinforcement member acting as feet.
FIG. 14 is a front view of an end of a wheel conveyor of the embodiment of the invention provided with a reinforcement member acting as feet.
FIG. 15 is a front view of the end of a wheel conveyor of the embodiment of the invention in the case where the reinforcement member acting as feet has been erected.
FIG. 16 is a side view of the end of a wheel conveyor of the embodiment of the invention in the case where a reinforcement member acting as feet has been erected.

DESCRIPTION OF THE PREFERRED EMBODIMENTS

Figure 1:
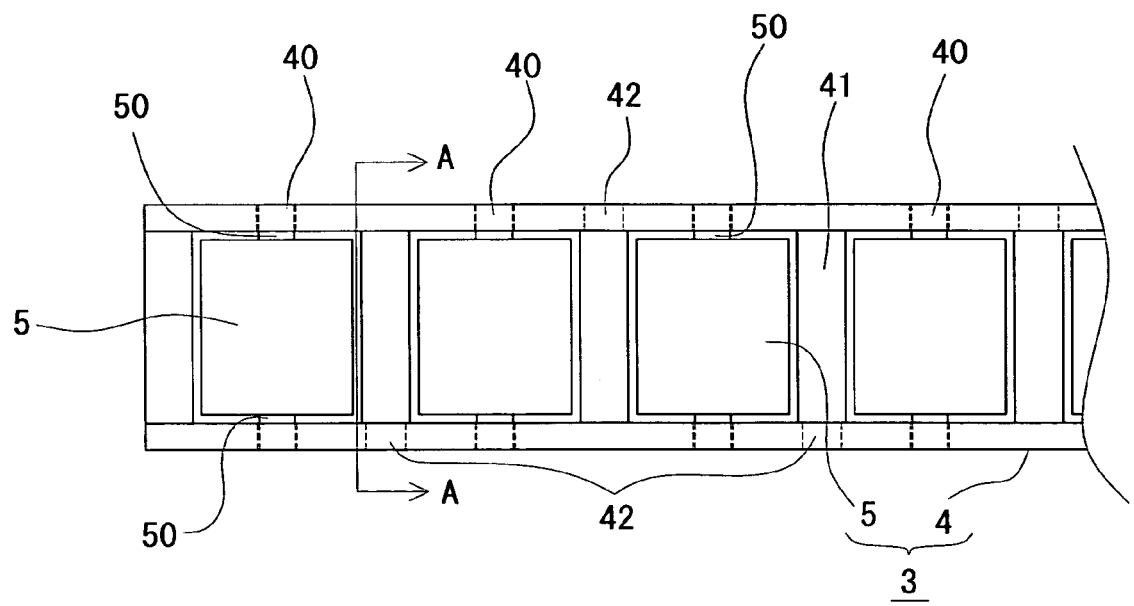
FIG. 1 to FIG. 16 show embodiments of this invention.
Figure 2:
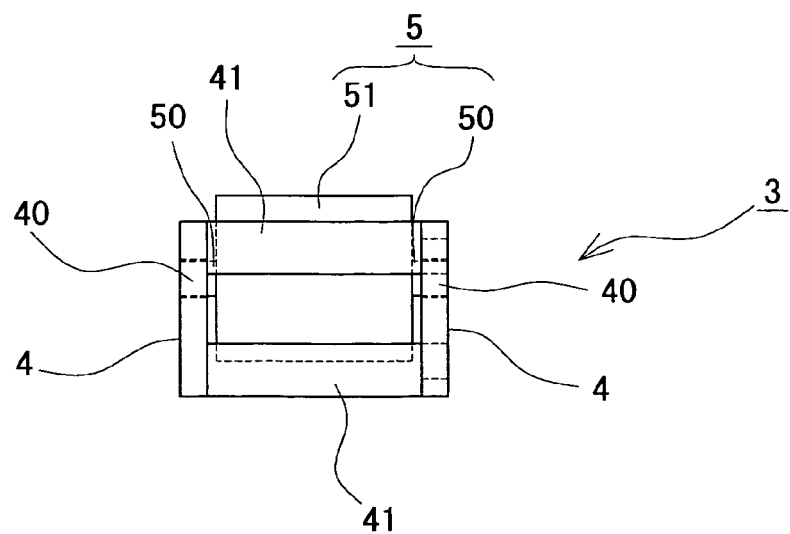

One embodiment of a wheel conveyor of the invention will now be described based on FIG. 1 to FIG. 15. A wheel conveyor C is comprised of side frames 1, 1 provided on either side in parallel, plate shaped stays 2, formed from plate bodies, attached bridging across the side frames 1, 1 and provided with wheel unit attachment grooves 20 in a direction orthogonal to the side frames 1 at an upper surface, a wheel unit 3 made up of a wheel 5 and a wheel attachment member 4 having fixed projections capable of being inserted into the wheel unit attachment grooves 20 provided in the upper surface of the plate-shaped stays 2, and a reinforcement member 6 acting as feet having rotational centers 60 in respective side frames 1, 1 at the end of the wheel conveyor, and provided spanning across the two side frames 1, 1.

The side frames 1, 1 are provided in parallel at either side section of the wheel conveyor C, and each side frame 1 is provided with a slide engagement groove 10 opening to an opposite surface of the frame (inner side) in a longitudinal direction. The slide engagement groove 10 opens at a longitudinal direction end part of the side frame 1 and is provided with detachable end section covers 11. With this embodiment, the side frame 1 is also provided with an engagement indent 12 on a lower surface, and is detachably attached to a mounting 7, but it is also possible to place directly on a flat surface such as the floor.

The plate-shaped stays 2 are plate-shaped bodies with a rectangular planar shape, and are provided with wheel unit attachment grooves 20 going in a widthwise direction of the conveyor orthogonal to the longitudinal direction of the side frame 1 at an upper surface. The size of the plate-shaped stays 2 in this embodiment is 30 mm-600 mm in length, about 40 mm in width and about 7 mm in depth. For the plate-shaped stays 2 and wheel unit attachment grooves 20, width represents the longitudinal direction of the conveyor (side frame) and length represents the width direction of the conveyor.

The wheel attachment grooves 20 are formed from grooves that widen out inside, and are provided in parallel in the plate width direction, but the number and arrangement of the grooves is dependent on the size and shape of the wheel conveyor C. With this embodiment, the wheel unit attachment groves 20 are five in number and arranged in parallel lines in the longitudinal direction of the frame. With this embodiment, central wheel unit attachment grooves 20b act as screw fastening holes for screw fastening when attaching the slide engagement sections 21 shown in FIG. 9 and FIG. 10 to both ends of the plate-shaped stays 2. Two wheel unit attachment grooves 20a at either side of the central grooves 20b are provided in parallel in this embodiment, and separated from each other by a distance of 6.25 mm.

Figure 9:
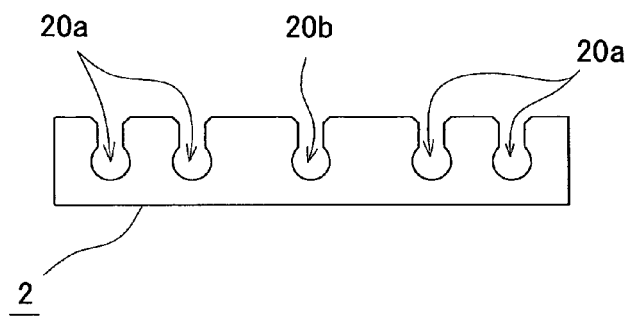
Figure 10:
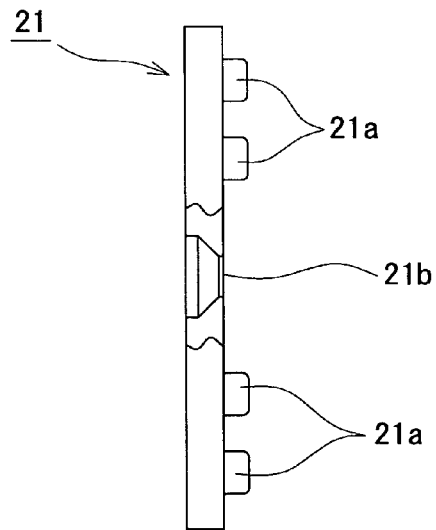
Figure 11:
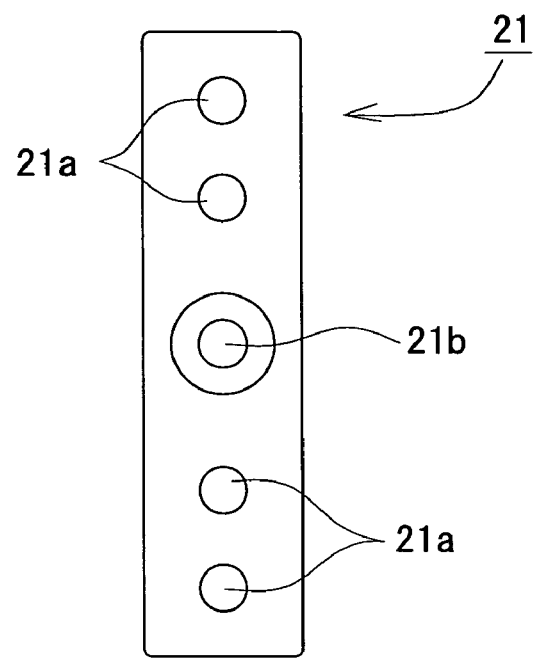
Figure 12:
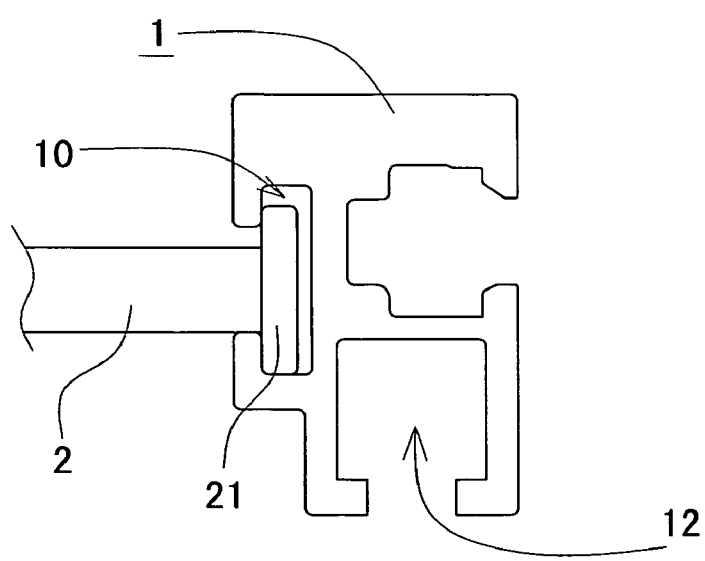
Figure 13:
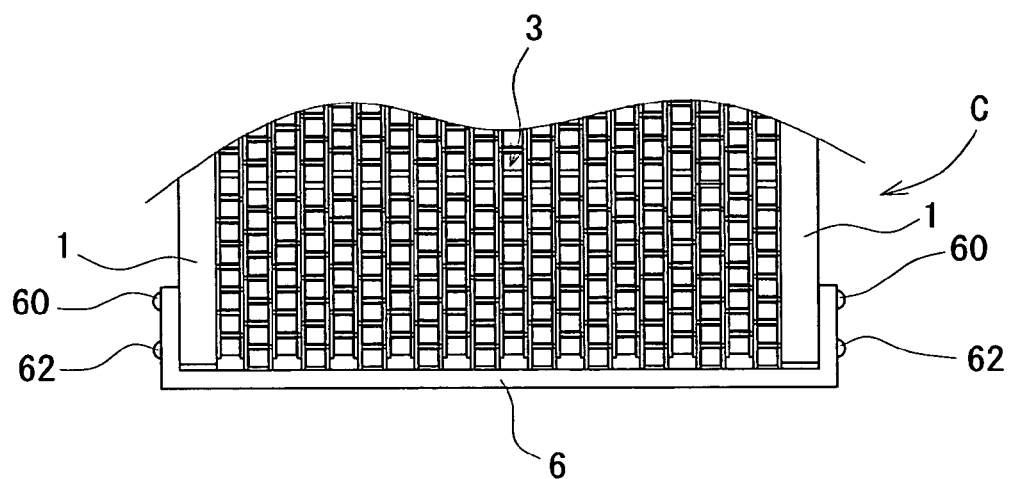
Figure 14:
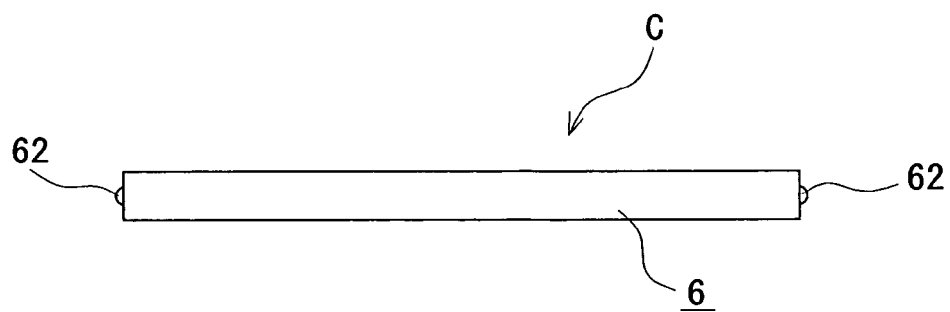

The plate-shaped stays 2 attach to and fix the slide engagement section 21 shown in FIG. 9 and FIG. 10 using screws, are fitted into the attachment grooves 10 of the side frame 1 and are slidable in the longitudinal direction of the side frame. The slide engagement sections 21 are provided with screw holes 21b corresponding to the central grooves 20b of the plate-shaped stays 2 in the center, and are attached using screws, not shown, to the central grooves 20b of the plate-shaped stay 2. Four projections 21a of a slide engagement section 21 are provided at positions corresponding to four wheel unit attachment grooves 20a, and are therefore respectively inserted into the four wheel attachment grooves 20a and reliably fixed by screw fastening. As another embodiment of the slide engagement section 21, it is also possible to have a form that is integral with both side end sections of the plate-shaped stay 2, engages with the attachment groove 10 of the side frame 1 and is slidable in a longitudinal direction of the side frame.

A wheel unit 3 is made up of a wheel attachment body 4 formed containing two plate-shaped bodies provided side by side, and a cylindrical wheel 5 provided capable of rotating by means of a rotation shaft 50 between the two wheel attachment bodies 4. A cylindrical body 51 of one wheel 5 is about 8 mm in cylinder diameter and about 10 mm in cylinder length, but the size is not limited.

Figure 3:
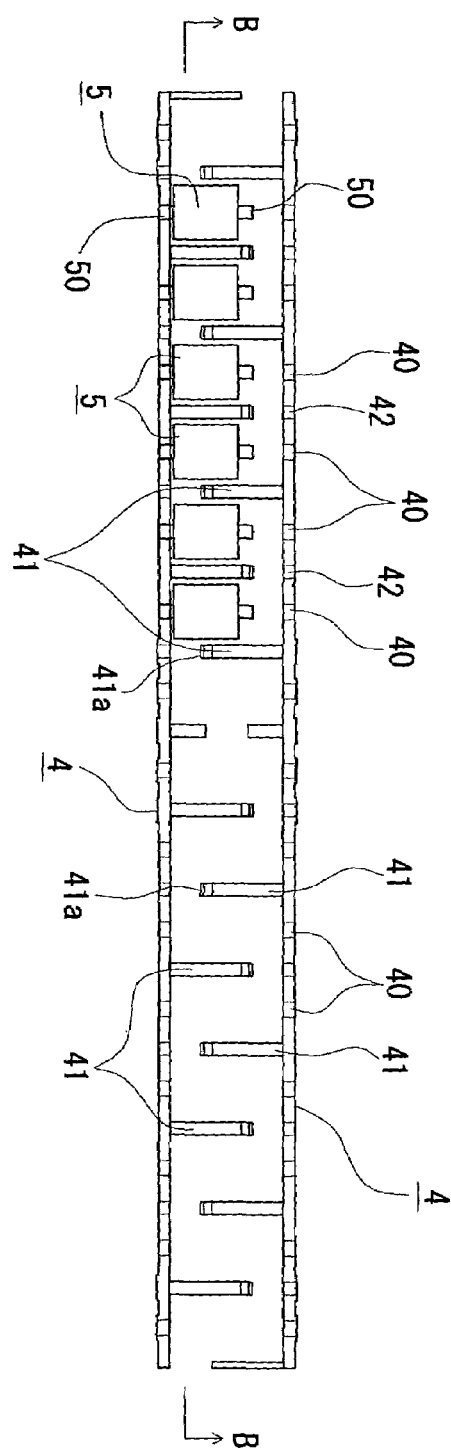
Figure 4:
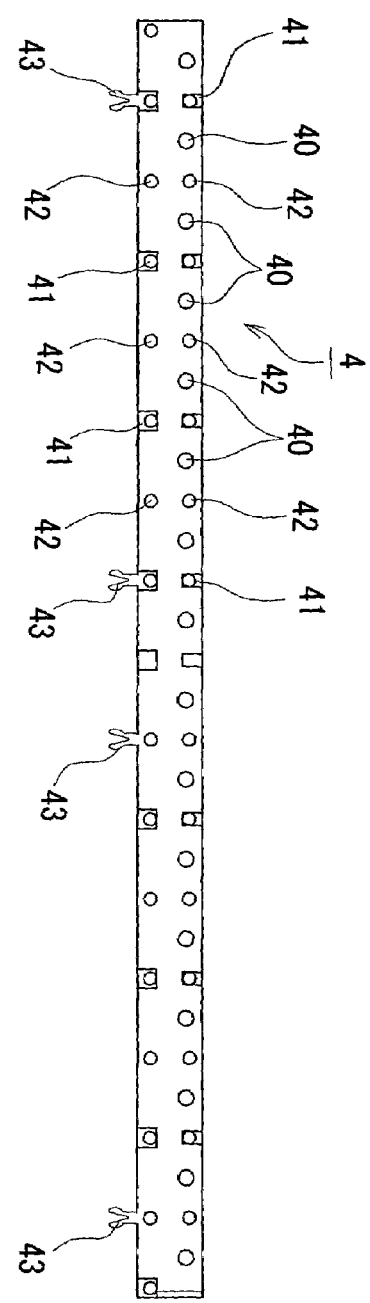

Respective wheel attachment bodies 4 have the same shape in this embodiment, with a plurality being provided keeping an appropriate interval between fixing protuberances 43 projecting downward to the lower surface of a plate-shaped body, as can be seen in FIG. 3 showing a plan view and FIG. 4 showing the inner side surface of one wheel attachment body 4, while at the same time rotational bearing holes 40 for rotatably supporting the rotational shafts 50 of the wheels 5 are provided at a plurality of positions facing each other in a longitudinal direction of the wheel attachment body, and a plurality of support sections 41 projecting in alternately opposite directions are provided in the longitudinal direction of the wheel attachment body. The support sections 41 are formed from two rod-shaped support sections that project respectively upward and downward in this embodiment. Respective fixing protuberances 43 are formed from protuberances that are divided in half and opened and close in a longitudinal direction of the wheel attachment body 4, and are detachably inserted into wheel unit attachment grooves 20 that widen out inside, to attach the wheel unit 3 to the plate-shaped stays 2.

Projecting ends 41a of support sections 41 of two wheel attachment bodies 4 are respectively fitted into support holding sections 42 provided on the inner surface of the wheel attachment bodies 4 for the opposite side. With respect to the wheel 5, in a state where the wheel 5 is provided capable of rotation by inserting the rotational shaft 50 provided projecting integrally on both end surfaces of the cylindrical body 51 into rotational bearing holes 40 of the wheel attachment body 4, a wheel unit 3 is assembled by respectively engaging projecting ends 41a of upper and lower support sections 41 in upper and lower support holding sections 42 provided on the inner surfaces of the wheel attachment units 4 on opposite sides.

The support sections 41 and support holding sections 42 of the wheel support section 4 are arranged alternately at intervals wider than the cylindrical diameter of the wheel 5 on both sides, between respective rotational bearing holes 40.

As another embodiment of the wheel attachment body 4, it is possible to form the support sections 41 as a single plate-shaped support section. It is also possible, instead of an arrangement order where a support section 41, rotational bearing hole 40, support holding section 42, rotational bearing hole 40, support section 41, rotational bearing hole 40—are repeatedly arranged in order on the longitudinal direction of the wheel attachment body 4, to have an arrangement such as support section 41, rotational bearing hole 40, support section 41, rotational bearing hole 40, support holding section 41, rotational bearing hole 40, support holding section 41—. It is also possible to have an assembly of differently shaped wheel attachment bodies 4.

Figure 15:
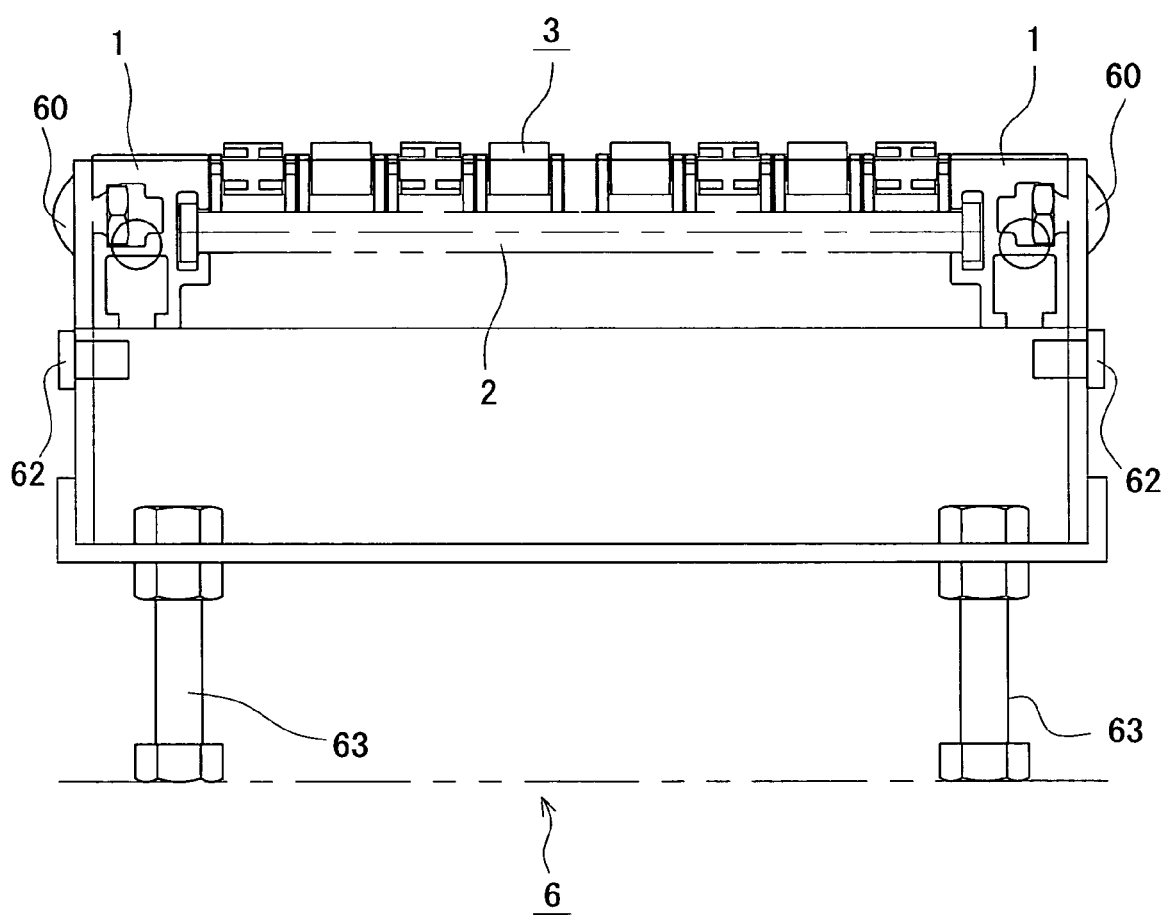
Figure 16:
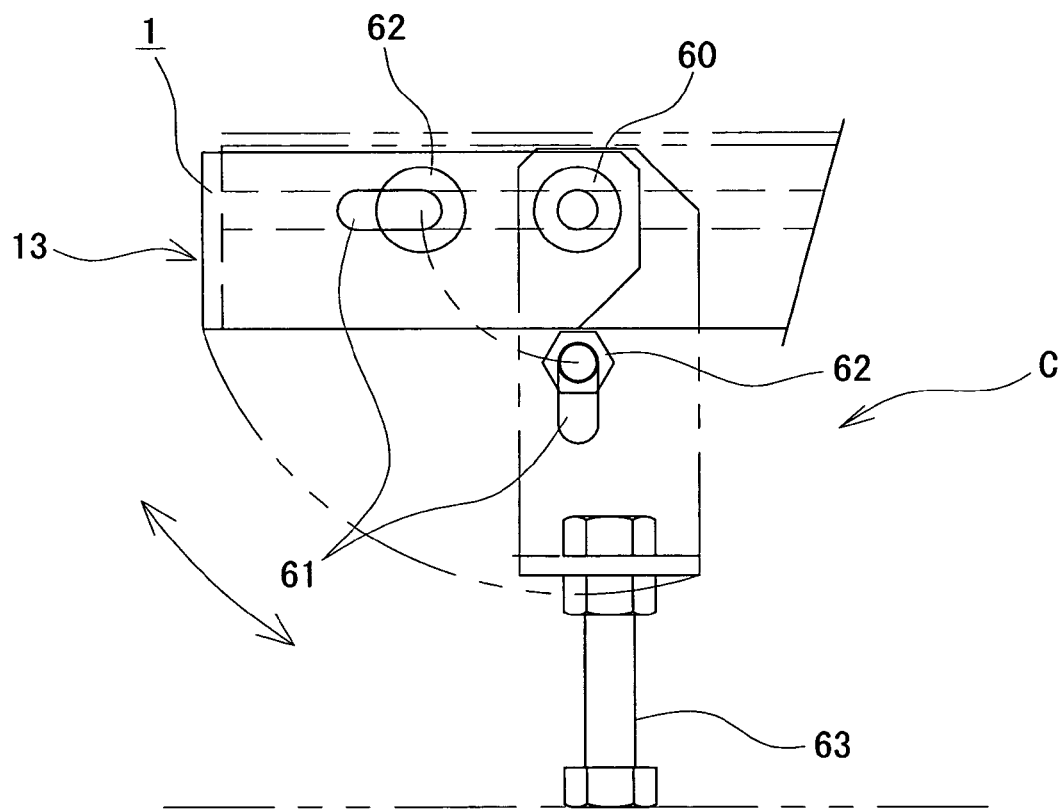

The reinforcement member acting as feet 6 is provided by plate-shaped bodies that have a square C-shape when viewed in plan bridging across side frames 1, 1 at one end section or both end sections of a wheel conveyor C. The reinforcement member acting as feet 6 has turning points 60 at positions separated by a specified distance from end sections 13 of the respective side frames 1, 1, and also an elongated long hole 61 is provided between the turning point 60 and the frame end section 13, with the reinforcement member acting as feet 6 being fixed to the two side frames 1, 1 at appropriate positions in the elongated hole 61 using fixing bolts 62. It is also possible to loosen the fixing bolts 62 and rotate downwards by about 90 degrees about the turning points 60 so that they are erected as feet as shown in FIG. 15 and FIG. 16. The reinforcement member acting as feet 6 can be fixed in the erected state by tightening the fixing bolts at a height position in the elongated hole where the fixing bolts 62 come into contact with the lower surface of the side frames 1, 1. Reference numeral 63 is a height adjustment bolt attached to the reinforcement section acting as feet 6.

Next, an assembly method and disassembly method for an embodiment of the wheel conveyor C of this invention will be described. A side frame 1 is either attached to a flat surface such as a floor or a table, or fixed to an attachment stand 7 using engagement indents 12, but only a single longitudinal end section cover is attached. The plate-shaped stays 2 are respectively previously provided with slide engagement sections 21 screw fastened at both side ends. Slide engagement sections 21 provided on both left and right end sections of the plate-shaped stays 2 with the wheel unit attachment grooves 20 of the plate-shaped stays 2 as the upper surface are made to sequentially engage in slide engagement grooves 10 of the side frame 1 from open sections of an end where an end cover 11 is not attached, slid in and provided between the side frames 1, 1. The number of plate-shaped stays 2 provided is different depending on the length of the wheel conveyor C, width of the plate-shaped stays 2, pitch of the wheel unit attachment grooves 20, interval between fixing protuberances 43 of the wheel unit 3, etc. With the embodiment shown in FIG. 5, plate-shaped stays 2 are provided in an appropriate number in the longitudinal direction of the side frame 1 with intervals between adjacent stays being the same as the stay width. Once an appropriate number of plate-shaped stay members have been provided, end covers 11 are attached to open end sections of the side frames 1 so that the plate-shaped stays 2 can not come out. Normally, in the case of installing a wheel conveyor on the floor, after attaching the end covers 11 to the open end sections of the side frames 1 the reinforcement member acting as feet 6 is attached so as to cover the frame end sections 13, and fixing bolts 62 are inserted and fixed into bolt holes that are provided in the side frames 1.

Also, in the case where the wheel conveyor C is installed at an incline, fixing bolts 62 of the reinforcement member acting as feet 6 provided on one end of the side frame 1 are loosened to allow rotation downwards by about 90 degrees about the turning point 60, so as to provide the incline. At this time it is possible to adjust the height using the height adjustment bolts 63.

The wheel units 3 are assembled by combining two wheel unit attachment bodies 4 and a plurality of wheels 5 either in advance or on-site. That is, assembly is carried out by inserting a rotational shaft on both sides of a wheel 5 into the rotational bearing hole 40, and inserting a support end 41a into a support holding section 42 on the opposite side.

Figure 5:
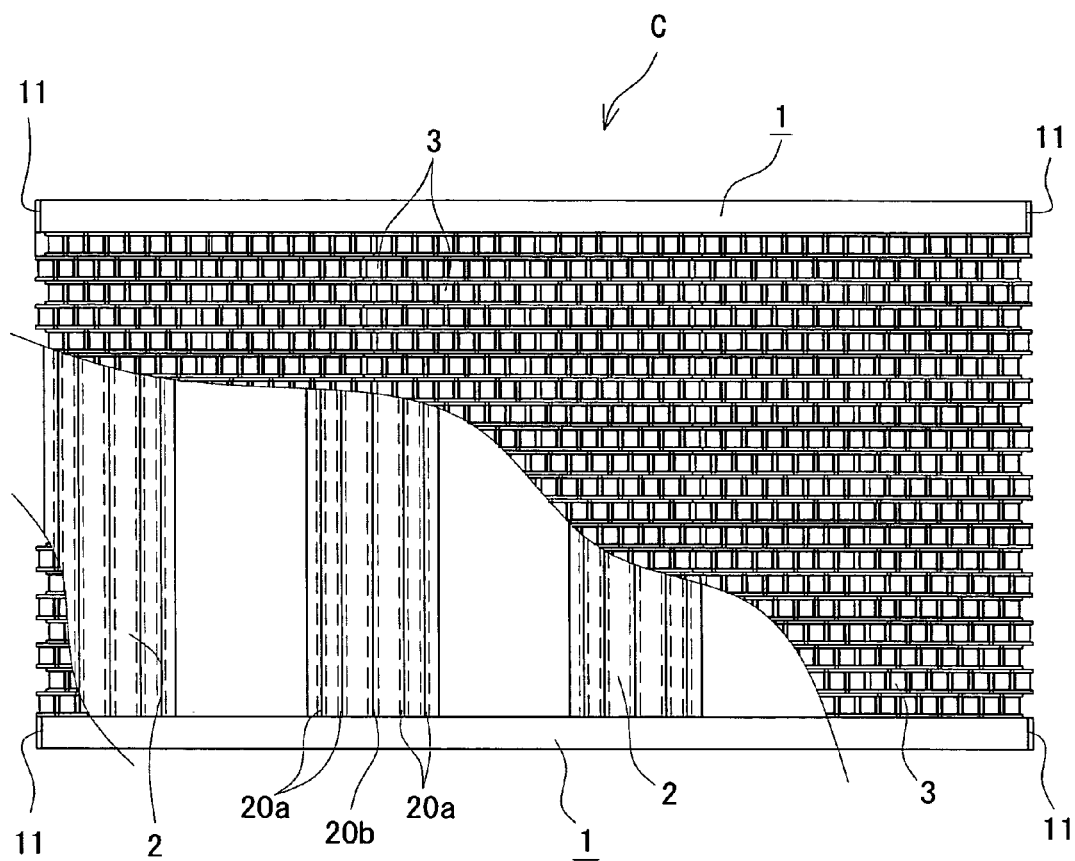
Figure 6:
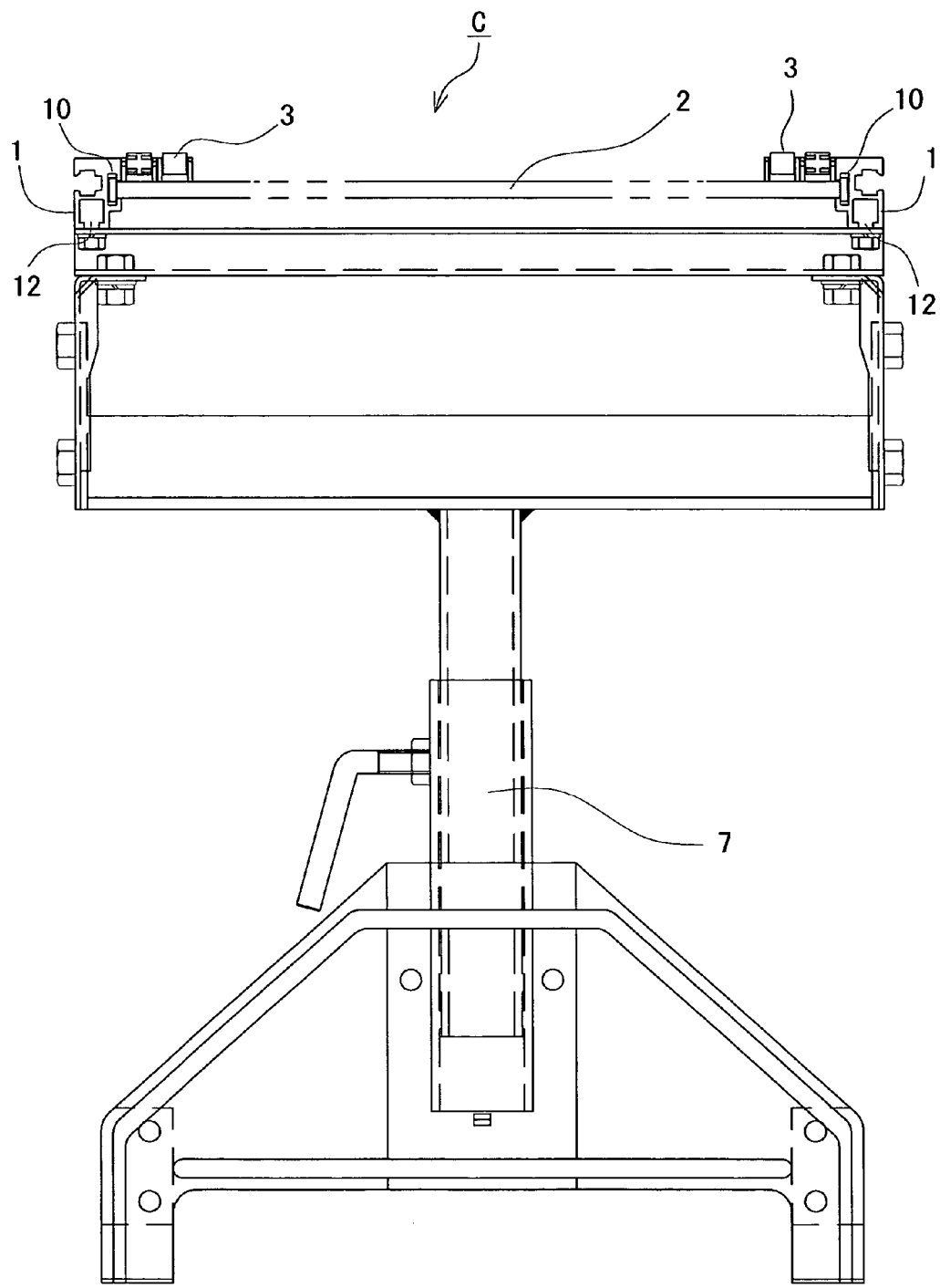
Figure 7:
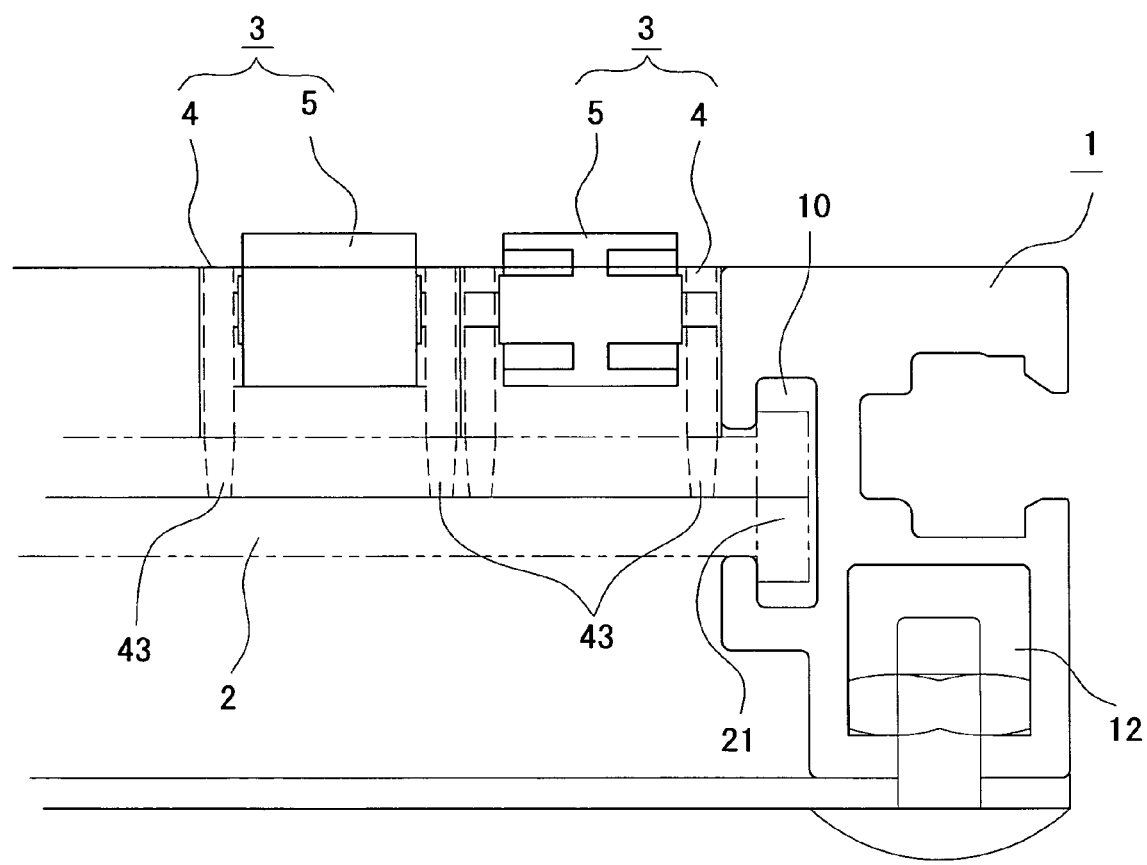
Figure 8:
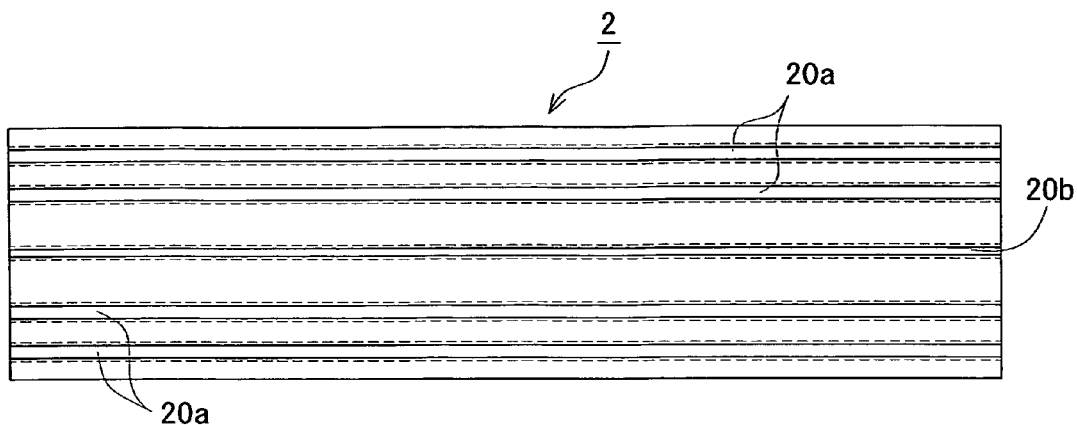

An assembled wheel unit 3 is fixed by sequentially inserting fixing protuberances 43 projecting to a lower part into wheel unit attachment grooves 20 of the plate-shapes stay 2. At this time, one wheel unit 3 is provided spanning across a plurality of plate-shaped stays 2. Fixing protuberances 43 for one wheel unit 3 are inserted spanning at least two or more adjacent plate-shaped stays 2, which means that a plurality of plate-shaped stays 2 in a longitudinal direction of the side frame 1 are connected by the wheel unit 3. As shown in FIG. 5, if wheel units 3 are provided in an interleaved arrangement with positions of the wheels 5 offset little by little in the longitudinal direction, all of the plate-shaped stays 2 are connected by the wheel unit 3. Also, the width of the plate-shaped stays 2 and an interval at which the wheel unit attachment grooves 20a are provided, and an interval at which the fixing protuberances 43 are provided, are provided at an interval so that they are aligned.

Arrangement of the wheel units 3 on the plate-shaped stays 2 can also be with the wheels 5 provided in-line side by side, as well as offset A plurality of wheel units 3 are provided in a line in the longitudinal direction and width direction on the plate-shaped stays 2 of the side frames 1, 1 so as to be detachable, to assemble a single wheel conveyor C.

Also, the method of disassembling the wheel conveyor C is to remove the end cover 1 on one side of the side frame 1, and then, with all the plate-shaped stays 2 and the wheel units 3 still connected, pulling out the plate shaped stay 2 from that end so that the slide engagement section 21 is slid inside the slide engagement grooves 10 of the side frame 1 to be removed from the side frame 1. All of the plate-shaped stays 2 and wheel units 3 can be removed from the side frame 1 in an extremely short time, the wheel units 3 are then removed from the plate-shaped stays 2, and it is possible to disassemble the wheel units 3.

According to this invention, since wheel units are assembled one at a time, the effect is achieved of being able to store and convey in a compact manner by disassembling for each component. Alternatively, since wheels are rotatably supported by a rotational shaft in a rotational bearing hole of a wheel attachment body, the possibility of the wheels falling off during transit, can be reduced.

Further, according to the invention of claim 2, by providing a reinforcement member acting as feet on end sections of the wheel conveyer, the structure enclosed between the two side frames is reinforced to improve safety, and in the case where the wheel conveyor is installed on an incline, it is possible to make an end section of the wheel conveyor higher by erecting the reinforcement section acting as feet by rotating about the turning points.

Also, according to the invention of claim 3, since wheel units are formed one at a time from two wheel attachment bodies of the same shape, the structure is simple compared to the related art, improving manufacturing efficiency, and also reducing manufacturing cost.

Also, with the invention of claim 4, plate-shaped stays do not require a fixing operation into the side frames, such as tightening bolts, and they can be connected together to enable sliding using the wheel units mounted above which means that compared to related art one, an assembly operation is made extremely easy, and in disassembly also they can be pulled out from the side frames by pulling and sliding all of the plate-shaped stays together with all of the wheel units from one end section in the longitudinal direction of the wheel conveyor while still connected. It is therefore possible to carry out a conveyor disassembly operation easily and in an extremely short time.

As a conveyor capable of conveying comparatively small objects to be conveyed, this invention can be assembled in various conveyor lengths and widths depending on the circumstances of various places, which means that possibilities of use in various conveyance centers and factories etc. are high.

What is claimed is:

1. A wheel conveyor, comprising:
   side frames provided in parallel on both sides, plate-shaped stays formed from plate bodies, attached hanging between side frames and provided with wheel unit attachment grooves on an upper surface, and wheel units having fixing protuberances for insertion into wheel unit attachment grooves formed into the plate-shaped stays, wherein the wheel units are formed from a combination of two wheel attachment bodies provided side by side, and a cylindrical wheel provided to rotate by means of a rotation shaft between the two wheel attachment bodies, each wheel attachment body is comprised of an attachment plate, provided with rotational bearing holes for axially supporting a rotation shaft of the wheel in a rotatable manner and support holding sections at a plurality of positions in a longitudinal direction, and a plurality of support sections provided projecting to the attachment plate in opposite directions in the longitudinal direction of the wheel attachment bodies, and a wheel unit is assembled by rotatably providing a wheel by inserting a rotation shaft into a rotation bearing between two attachment plates, at the same time as fitting projecting end sections of support sections of each wheel attachment plate into support holding sections provided in opposite wheel attachment plates, and together with detachably attaching a plurality of wheel units on a plurality of plate-shaped stays provided spanning in the longitudinal direction between side frames in a line arrangement in the longitudinal direction of the side frames, by inserting a plurality of the fixing protuberances into the wheel unit attachment grooves of the plate-shaped stays, the plurality of the fixing protuberances are detachably attached in the wheel unit attachment grooves in a width direction.

2. The wheel conveyer disclosed in claim 1, having reinforcement members acting as feet that are made into feet by rotating down and erecting as feet, at either end sections of the wheel conveyor, turning points in respective side frames.

3. The wheel conveyor of claim 1 or claim 2, wherein respective wheel attachment bodies of the wheel unit are formed in the same shape, and are wheel attachment bodies having support sections and support holding sections alternately at wider intervals than a cylindrical diameter of a wheel on both sides enclosing rotation bearing holes in the longitudinal direction of each wheel attachment plate.

4. A wheel conveyor comprising:
side frames provided in parallel on both sides, plate-shaped stays formed from plate bodies, attached hanging between side frames and provided with wheel unit attachment grooves on an upper surface, and wheel units having fixing protuberances capable of insertion into wheel unit attachment grooves of the plate-shaped stays, wherein the wheel units are formed from a combination of two wheel attachment bodies provided side by side, and a cylindrical wheel provided to rotate by means of a rotation shaft between the two wheel attachment bodies, each wheel attachment body is comprised of an attachment plate, provided with rotational bearing holes for axially supporting a rotation shaft of the wheel in a rotatable manner and support holding sections at a plurality of positions in a longitudinal direction, and a plurality of support sections provided projecting to the attachment plate in opposite directions in the longitudinal direction of the wheel attachment bodies, and a wheel unit is assembled by rotatably providing a wheel by inserting a rotation shaft into a rotation bearing between two attachment plates, at the same time as fitting projecting end sections of support sections of each wheel attachment plate into support holding sections provided in opposite wheel attachment plates, and together with detachably attaching a plurality of wheel units on plurality of plate-shaped stays provided spanning in the longitudinal direction between side frames in a line arrangement in the longitudinal direction of the side frames, by inserting a plurality of fixing protuberances into the wheel unit attachment grooves of the plate-shaped stays, the plurality of fixing protuberances are detachably attached in the wheel unit attachment grooves in a width direction,
wherein the side frames are provided in parallel to each other, slide engagement grooves are provided spanning in the longitudinal direction to an opposite frame side, slide engagement sections are provided in both ends of the plate-shaped stays, the slide engagement sections engage with slide engagement grooves of the side frames and are slidable in the longitudinal direction of the side frames, and a plurality of plate-shaped stays provided connecting together in the longitudinal direction of the side frames are slidable plate-shaped stays connecting by the mounting of wheel units.

5. A wheel conveyor comprising:
side frames provided in parallel on both sides, plate-shaped stays formed from plate bodies, attached hanging between side frames and provided with wheel unit attachment grooves on an upper surface, and wheel units having fixing protuberances capable of insertion into wheel unit attachment grooves of the plate-shaped stays, wherein the wheel units are formed from a combination of two wheel attachment bodies provided side by side, and a cylindrical wheel provided to rotate by means of a rotation shaft between the two wheel attachment bodies, each wheel attachment body is comprised of an attachment plate, provided with rotational bearing holes for axially supporting a rotation shaft of the wheel in a rotatable manner and support holding sections at a plurality of positions in a longitudinal direction, and a plurality of support sections provided projecting to the attachment plate in opposite directions in the longitudinal direction of the wheel attachment bodies, and a wheel unit is assembled by rotatably providing a wheel by inserting a rotation shaft into a rotation bearing between two attachment plates, at the same time as fitting projecting end sections of support sections of each wheel attachment plate into support holding sections provided in opposite wheel attachment plates, and together with detachably attaching a plurality of wheel units on plurality of plate-shaped stays provided spanning in the longitudinal direction between side frames in a line arrangement in the longitudinal direction of the side frames, by inserting a plurality of fixing protuberances into the wheel unit attachment grooves of the plate-shaped stays, the plurality of fixing protuberances are detachably attached in the wheel unit attachment grooves in a width direction,
wherein respective wheel attachment bodies of the wheel unit are formed in the same shape, and are wheel attachment bodies having support sections and support holding sections alternately at wider intervals than a cylindrical diameter of a wheel on both sides enclosing rotation bearing holes in the longitudinal direction of each wheel attachment plate, and
wherein the side frames are provided in parallel to each other, slide engagement grooves are provided spanning in the longitudinal direction to an opposite frame side, slide engagement sections are provided in both ends of the plate-shaped stays, the slide engagement sections engage with slide engagement grooves of the side frames and are slidable in the longitudinal direction of the side frames, and a plurality of plate-shaped stays provided connecting together in the longitudinal direction of the side frames are slidable plate-shaped stays connecting by the mounting of wheel units.

* * * * *